United States Patent [19]

Saito et al.

[11] Patent Number: 4,660,949
[45] Date of Patent: Apr. 28, 1987

[54] AUTOMATIC FILM SENSITIVITY SETTING DEVICE FOR CAMERAS

[75] Inventors: Takeo Saito; Shinji Nagaoka, both of Yotsukaido, Japan

[73] Assignee: Seiko Koki Kabushiki Kaisha, Chiba, Japan

[21] Appl. No.: 874,809

[22] Filed: Jun. 13, 1986

Related U.S. Application Data

[63] Continuation of Ser. No. 648,016, Sep. 6, 1984, abandoned.

[30] Foreign Application Priority Data

Sep. 7, 1983 [JP] Japan .............................. 58-164547

[51] Int. Cl.[4] .............................................. G03B 7/24
[52] U.S. Cl. .................................................... 354/21
[58] Field of Search ............................ 354/21, 289.1; 352/78 C

[56] References Cited

U.S. PATENT DOCUMENTS 4,431,283 2/1984 Hoda et al. ............................ 354/21
4,437,742 3/1984 Taniguchi ............................. 354/21

Primary Examiner—William B. Perkey
Attorney, Agent, or Firm—Robert E. Burns; Emmanuel J. Lobato; Bruce L. Adams

[57] ABSTRACT

An automatic film sensitivity setting device for cameras in which film sensitivity indicated in coded form on a loaded film package is automatically read in by electric signal terminals and introduced to an exposure control circuit as a parameter for the calculation and control of exposure, characterized in that the device is arranged to elect a predetermined specific film sensitivity in the absence of valid coded information of film sensitivity on a film case of the package, and in the case of an ordinary film package without the coded information, to elect a predetermined specific film sensitivity in the absence of information in any one of the electric signal terminals.

13 Claims, 6 Drawing Figures

| Code ASA | 2 | 3 | 4 | 5 | 6 |
|---|---|---|---|---|---|
| 25 | — | — | — | 5 | — |
| 32 | — | — | — | — | 6 |
| 40 | — | — | — | 5 | 6 |
| 50 | 2 | — | — | 5 | — |
| 64 | 2 | — | — | — | 6 |
| 80 | 2 | — | — | 5 | 6 |
| 100 | — | 3 | — | 5 | — |
| 125 | — | 3 | — | — | 6 |
| 160 | — | 3 | — | 5 | 6 |
| 200 | 2 | 3 | — | 5 | — |
| 250 | 2 | 3 | — | — | 6 |
| 320 | 2 | 3 | — | 5 | 6 |
| 400 | — | — | 4 | 5 | — |
| 500 | — | — | 4 | — | 6 |
| 640 | — | — | 4 | 5 | 6 |
| 800 | 2 | — | 4 | 5 | — |
| 1000 | 2 | — | 4 | — | 6 |
| 1250 | 2 | — | 4 | 5 | 6 |
| 1600 | — | 3 | 4 | 5 | — |
| 2000 | — | 3 | 4 | — | 6 |
| 2500 | — | 3 | 4 | 5 | 6 |
| 3200 | 2 | 3 | 4 | 5 | — |
| 4000 | 2 | 3 | 4 | — | 6 |
| 5000 | 2 | 3 | 4 | 5 | 6 |

*FIG. 3*

AUTOMATIC FILM SENSITIVITY SETTING DEVICE FOR CAMERAS

This is a continuation of application Ser. No. 648,016, filed Sept. 6, 1984, now abandoned.

BACKGROUND OF THE INVENTION

Field of the Invention

This invention relates to a device for automatically setting a camera for the film sensitivity of a loaded film, and more particularly to an automatic film sensitivity setting device which is capable of automatically setting the sensitivity of a loaded film from electric signal terminals provided on the film case to indicate a specific film sensitivity in coded form.

Roll film packages recently released from Eastman Kodak of the United States bear on the circumference of the film case a bar code of a checkerboard-like pattern, which is generally called CAS (Camera Auto Sensing), consisting of a number of patches forming conductive metallic sections and insulating sections. These patches comprise film sensitivity data which indicate the sensitivity of the film by a binary code so that it can be read electrically.

There has already been proposed means for automatically reading the coded information or data of film sensitivity on the film case and introducing same to an exposure control circuit. According to this conventional means, upon loading of the film case with coded information of film sensitivity, the code is read by contacts provided in the film loading chamber of the camera and fed to a digital circuit where coded digital signals are converted to an analog signal by a D/A conversion circuit. This analog signal is fed to an arithmetic circuit to calculate and control the exposure on the basis of the film sensitivity and information of the subject luminosity received from a light measuring circuit.

In addition to the above-mentioned code reading contacts, the film loading chamber has to be provided with contacts exclusively used for detecting the film packages which have no coded information on the film cases. By the signals from these additional contacts, the operation is switched to the manual mode to supply the information of film sensitivity from a separately provided manual selector to the D/A conversion circuit, introducing the resulting analog signal to the arithmetic circuit.

According to this method, for the introduction of film sensitivity of film packages with the coded information, there have to be provided D/A conversion circuits in a number corresponding to that of the film sensitivity codes, resulting in a complicated circuit construction and an increased cost.

Further, it is necessary to provide separately a manual film sensitivity setting device along with encoder switches to permit manual setting for ordinary film packages without the coded information. This also gives rise to problems such as complicated construction and increased size.

SUMMARY OF THE INVENTION

It is therefore an object of the present invention to overcome the above-mentioned drawbacks or problems. A more specific object of the present invention is to provide an automatic film sensitivity setting device which is suitable for the above-mentioned auto sensing film packages as well as ordinary film packages without the coded information.

According to the present invention, there is provided an automatic film sensitivity setting device for cameras of the type in which film sensitivity indicated in coded form on a loaded film package is automatically read in by electric signal terminals and introduced to an exposure control circuit as a parameter for the calculation and control of the exposure, characterized in that the device is arranged to always select a predetermined one-and-the-same specific film sensitivity in the absence of valid coded information of film sensitivity on a film case of the package.

In the case of an ordinary film package without the coded information, a predetermined one-and-the-same specific film sensitivity always selected upon detection of the absence of information at all of the electric signal terminals.

The above and other objects, features and advantages of the invention will become apparent from the following description and appended claims, taken in conjunction with the accompanying drawings which show by way of example preferred embodiments of the invention.

BRIEF DESCRIPTION OF THE DRAWINGS

In the accompanying drawings:

FIG. 3 is a table showing the coded information in relation with the corresponding film sensitivities;

DESCRIPTION OF PREFERRED EMBODIMENTS

Figure 1:
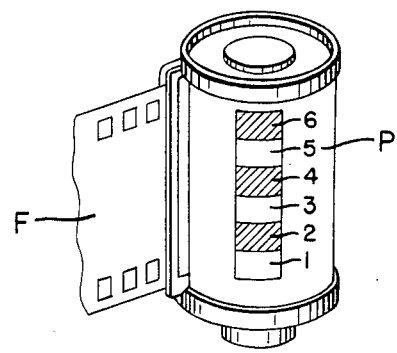
FIG. 1 is a perspective view of a roll film package with coded information of film sensitivity on a case thereof.

Hereafter, the invention is described more particularly by way of a preferred embodiment shown in the drawings.

Referring first to FIG. 1, there is illustrated in perspective view a roll film package containing a roll of film F in a case P with code sections indicating the film sensitivity in a coded signal. Of the code sections 1 to 6 which are provided on the circumference of the film case P, the hatched sections 2, 4 and 6 are coated with a paint to form insulating areas, while coded sections 1, 3 and 5 are uncoated to form conductive areas exposing a metal material. In this instance, the code section 1 on all auto sensing film cases is conductive to provide a common electrode irrespective of the sensitivity of the films.

Figure 2:
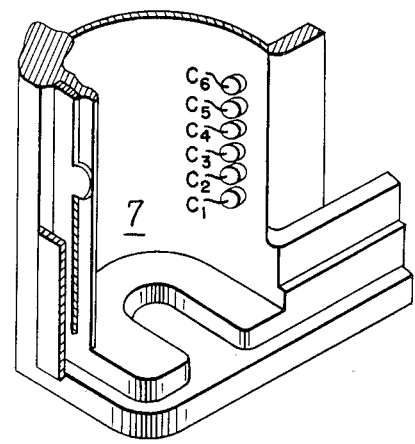
FIG. 2 is a sectioned perspective view of a film loading chamber of a camera.

Shown in sectioned perspective view in FIG. 2 is a film sensitivity reading section in a camera incorporating the present invention for reading the sensitivity of a film in an auto sensing package as shown in FIG. 1. In FIG. 2, denoted at 7 is a film loading chamber which is provided with contact pins C1 to C6 for reading in the signals in the code sections 1 to 6 on the film case P. The contact pins C1 to C6 are each urged to protrude into the film loading chamber 7 by a spring or other suitable means although not shown.

Upon loading the auto sensing film package of FIG. 1 in the film loading chamber 7, the code sections 1 to 6 are contacted with the contact pins C1 to C6 thereby to read in the coded signal of film sensitivity and send it to a circuit which will be described hereafter.

Referring to the code table of FIG. 3, the conducting and insulating states of the code sections 2 to 6 are shown in relation to various film sensitivities. Here, the code section 1 is omitted since it is always conductive as mentioned hereinbefore. The table of FIG. 3 indicates conductive sections by corresponding numbers and insulating sections by a hyphen "-". Namely, the code section 5 alone is conductive in the case of ASA 25, and the code sections 3 and 5 are conductive and the code sections 2, 4 and 6 are insulated in the case of ASA 100.

Figure 4:
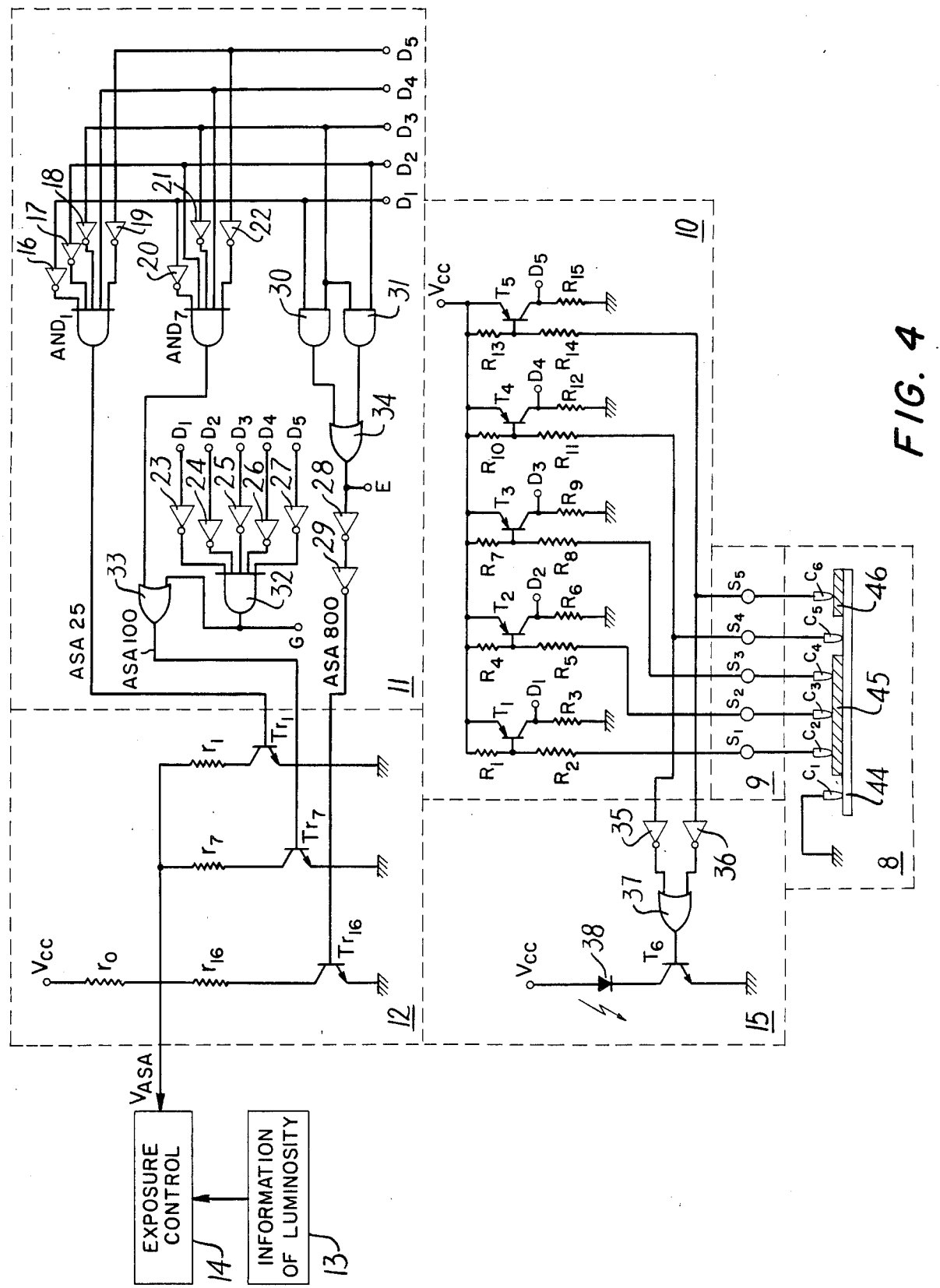
FIG. 4 is a circuit diagram of an automatic film sensitivity setting device embodying the present invention.

FIG. 4 shows a circuit for automatically setting the film sensitivity of an auto sensing film package as shown in FIG. 1. In FIG. 4, indicated at 8 is an input circuit for automatically setting the film sensitivity data (hereinafter referred to simply as "auto setting" for brevity) from the coded information on the film package, and at 9 an input terminal section to which the information of sensitivity is applied in both auto and manual setting. The reference numerals 44 to 46 indicate surface areas of the code section on the film case, of which the area 44 is conductive and areas 45 and 46 are insulated. In the particular embodiment shown, the code sections 1 and 5 alone are conductive, giving a signal that the film sensitivity of the loaded package is ASA 25 as explained in relation with FIG. 3. Designated at C1 to C6 are contact pins as shown in FIG. 2.

The contact pins C2 to C6 are connected to the terminals S1 to S5 of the input terminal section 9, respectively, and the contact pin C1 is connected to GND.

A code input circuit 10 consists of five circuit blocks of the same construction, which respectively correspond to the input terminals S1 to S5. If a contact pin C comes into contact with the conduting area of the film case and is connected to GND through the contact pin C1, the corresponding transistors T1 to T5 are turned on to produce signals D1 to D5 at the respective collectors.

Indicated at 11 is a code converter of which only the circuits for converting the codes of ASA 25, ASA 100 and ASA 800 are shown by way of example. The signals D1 to D5 from the code input circuit 10 are applied to the code converter in the manner as shown in the drawing.

The reference numeral 12 denotes a D/A conversion circuit which converts the signal from the code converter 11 into an analog sigal. By the output signal of the code converter 11, which specifies a particular film sensitivity, only a corresponding one of transistors Tr1 to Tr16 which represent different film sensitivities is turned on (Tr2 to Tr6 and Tr8 to Tr15 are omitted in the drawing). For example, in the case of ASA 25, the transistor Tr1 alone is turned on, permitting current of flow from a power supply Vcc to GND through reference resistor r0 and resistor r1.

As a result, a voltage as divided by the reference resistor r0 and resistor r1 is produced at the output terminal. The values of resistors r1 to r16 (of which r2 to r6 and r8 to r15 are not shown) are selected such that the voltages as divided by them and the reference resistors r0 correspond to the respective film sensitivities.

The output voltage obtained from the D/A conversion circuit 12 is fed to an exposure control circuit 14 thereby to calculate and control the exposure based on the film sensitivity and the luminosity information 13.

Denoted at 15 is an indicator circuit which turns on a display element such as an LED upon loading a camera with a film package with the coded information as shown in FIG. 1.

With regard to the operation by the circuit of FIG. 4, the code section 5 is conductive when a package of ASA 25 film is loaded in the camera, so that the contact pin C5 comes into contact with the conductor 44 as shown in the drawing and is connected to GND through the conductor 44 and contact pin C1. Accordingly, as current flows from the base of the transistor T4 through the resistor 11 and input terminal S4, the transistor T4 is turned on and the collector current flows through the resistor r12 to produce the output D4 of "H".

On the other hand, the contact pins C2 to C4 and C6 are in contact with insulators 45 and 46 as shown in the drawing, and the transistors T1 to T3 and T5 remain off since their base currents have no route to flow. Accordingly, the signals D1 to D3 and D5 are all "L".

These signals are fed to the code converter 11, applying the signals D1 to D3 and D5 to input terminals of AND circuit AND1 through inverters 16 to 19, respectively. However, its output becomes "H" since the signal D4 of "H" is directly fed thereto, turning on the transistor Tr1.

On the other hand, the output of AND circuit AND7 which is supplied with the signal D2 becomes "L" and this signal is fed to one input terminal of OR circuit OR33. Further, AND circuit AND 32 which receives at its input terminal the signal D4 of "H" through inverter 26 produces an output of "L" for supply to the other input terminal of the OR circuit OR33, so that the output of the latter becomes "L" to turn off the transistor Tr7.

The AND circuits 30 and 31 which receive the signal D3 of "L" at their input terminals produce outputs of "L", and these signals are fed to the base of the transistor Tr16 through OR circuit 34 and inverters 28 and 29 to turn off the transistor Tr16. Since the transistor Tr1 alone is on, a voltage divided by the reference resistor r0 and the resistor r1 is produced at the output $V_{ASA}$, applying to the exposure control circuit 14 a voltage corresponding to ASA 25 thereby calculating and controlling the exposure along with the luminosity information 13.

In a case where a film package of ASA 100 is loaded in the camera, the code sections 3 and 5 are conductivé as shown in FIG. 3, so that current flows from the base of the transistor T2 and GND through resistor R5, input terminal S2 and contact pins C3 and C1, turning on the transistor T2 as well as the transistor T4. Consequently, the signals D2 and D4 become "H". On the other hand, since the contact pins C2, C4 and C6 come into contact with the insulators 45 and 46, the transistors T1, T3 and T5 are turned off, and therefore the signals D1, D3 and D5 become "L". The respective D signals are fed to the code converter 11, applying to the input terminals of AND circuit AND7 the D2 and D4 signals of "H" and the signals D1, D3 and D5 turned from "L" to "H" through the inverters 20, 21 and 22. Therefore, the output of the AND circuit AND7 and the output of the OR circuit 33 become "H", turning on the transistor Tr7.

Further, the AND circuit AND1 which receives at its input terminal the signal D2, turned from "H" to "L" through the inverter 17, produces an output of "L", and the AND circuits 30 and 31 which are supplied with the signal D3 of "L" similarly produced outputs of "L". As a result, both of the transistors Tr1 and Tr16 are turned off. Since the transistor Tr7 alone is on, a voltage divided by the reference resistor r0 and resistor r7 is produced at the output $V_{ASA}$, supplying the exposure control circuit 14 with a voltage corresponding to ASA 100.

Although the operations for setting ASA 25 and ASA 100 are described in the foregoing description, it is possible to set the film sensitivity of from ASA 25 to ASA 640 in the embodiment of FIG. 4 according to the codes shown in FIG. 3. For example, when setting ASA 32, the input terminal S5 alone becomes "L", so that the signal D5 of "H" is applied to the code converter 11 for conversion into a code, and transistor Tr2 (not shown) of the D/A conversion circuit 12 is turned on to produce at the output $V_{ASA}$ a voltage divided by the reference resistor r0 and resistor r2 (not shown).

In the case of ASA 80, transistor Tr6 (not shown) of the D/A conversion circuit 12 is turned on to produce at the output $V_{ASA}$ a voltage divided by the reference resistor r0 and resistor r6 (not shown).

Further, in the case of ASA 640, transistor Tr15 (not shown) of the D/A conversion circuit 12 is turned on to produce at the output $V_{ASA}$ a voltage divided by the reference resistor r0 and resistor r15 (not shown).

With respect to high sensitivity films of ASA 800 or higher, there arises a problem that the circuit will become complicated if the D/A conversion circuit is provided for each high speed film. In this regard, the present invention contemplates maintaining the simplicity of the circuit construction by arranging to always select one specific film sensitivity for high sensitivity films which are used less frequently.

This operation is explained by way of the embodiment of FIG. 4. For this purpose, AND circuits 30 and 31, OR circuit 34, inverters 28 and 29, transistor Tr16 and resistor r16 are connected in the manner as shown, applying the signals D1 and D3 to the input terminals of the AND circuit 30 and applying the signals D2 and D3 to the input terminals of the AND circuit 31.

As clear from FIG. 3, the code sections 2 and 4 are invariably conductive for films in the speed range of from ASA 800 to ASA 1250, and the code sections 3 and 4 are invariably conductive for films from ASA 1600 to 5000. Accordingly, the signals D1 and D3 become "H" if a film in the speed range of ASA 800 to ASA 1250 is loaded, and the signals D2 and D3 become "H" if a film of ASA 1600 to ASA 5000 is loaded. Namely, the output of the AND circuit 30 turns to "H" in the case of ASA 800 to ASA 1250, and the output of the AND circuit 31 turns to "H" in the case of ASA 1600 to ASA 5000. Since these signals are applied to the base of the transistor Tr16 through OR circuit 34 and inverters 28 and 29, the transistor Tr16 is turned on to produce an output voltage divided by the reference resistor r0 and resistor r16. In this instance, the value of the resistor r16 is selected such that the voltage as divided by the reference resistor r0 and the resistor r16 corresponds to ASA 800. In this maannier, the same film sensitivity (ASA 800) is always selected for films in the speed range of from ASA 800 to ASA 5000.

Figure 5:
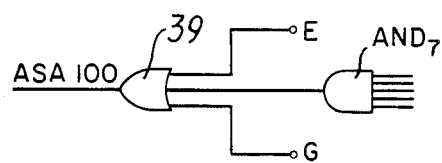
FIG. 5 is a diagram of a circuit for establishing a particular film sensitivity in the absence of coded information.

FIG. 5 shows a modification which is arranged to elect or select ASA 100 for films of ASA 800 to ASA 5000 instead of handling them as ASA 800 as in the foregoing embodiment. The AND circuit AND7 of FIG. 5 is same as the one employed in the embodiment of FIG. 4, and a three-input OR circuit 39 is provided in place of the OR circuit 33. The OR circuit 39 receives at its input terminals the output of the AND circuit AND7, the output G of the AND circuit 32 in FIG. 4, and the output E of the OR circuit 34. The output of the OR circuit 39 is applied to the transistor Tr7.

Upon loading a film of from ASA 800 to ASA 5000, the output of the OR circuit 34, namely, the signal E invariably turns to "H", and is fed to the OR circuit 39 to turn its output to "H", turning on the transistor Tr7. Consequently, a voltage corresponding to ASA 100 is produced at the output terminal. In this case, the inverters 28 and 29, transistor Tr16 and resistor r16 of FIG. 4 are unnecessary.

Reverting to the embodiment of FIG. 4, in this case arrangements are made to elect or select the film sensitivity of ASA 800 for films of from ASA 800 to ASA 1000. Of course it is possible to set a film sensitivity other than ASA 800 by selecting the value of resistor r16 so that a voltage corresponding to a desired film sensitivity will be produced at the output terminal.

Turning now to the indicator circuit 15, it is arranged to illuminate a display element 38 like an LED upon loading an auto sensing film package with the coded information, for drawing the attention of a user. As clear from FIG. 3, both or one of the code section 5 and 6 is always conductive, so that at least one of the input terminals S4 and S5 is connected to GND upon loading an auto sensing film package, and the resulting signal or signals are fed through inverters 35 and 36 to the OR circuit 37 to turn its output to "H". As a consequence, the transistor T6 is turned on and the display element 38 is turned ON to indicate loading of an auto sensing film package.

Aside from the introduction of the information of film sensitivity to the exposure control circuit from the coded information given on the auto sensing film package, the description is now directed to the operation for ordinary film packages without such coded information.

In the particular embodiment shown, arrangements are made to elect the film sensitivity of ASA 100 which is used with relatively high frequency. Namely, upon loading a film package without the coded information, the contact pins C1 to C6 all come into contact with an insulated area and all of the input terminals S1 to S5 turn to "H" level. Accordingly, the transistors T1 to T5 are all turned off to produce signals D1 to D5 of "L". These signals are applied to the code converter 11, turning to "L" the outputs of the AND circuits AND1 and AND7 as well as the output of the AND circuits 30 and 31.

On the other hand, since the AND circuit 32 receives at its input terminals the signals D1 to D5 of "L" through inverters 23 to 27, its output turns to "H" and this signal is applied to the base of the transistor Tr7 through the OR circuit 33, turning on the transistor Tr7 to produce at the output a voltage divided by the reference resistor r0 and resistor r7.

Needless to say, the film sensitivity to be elected for ordinary film packages is not restricted to ASA 100.

Figure 6:
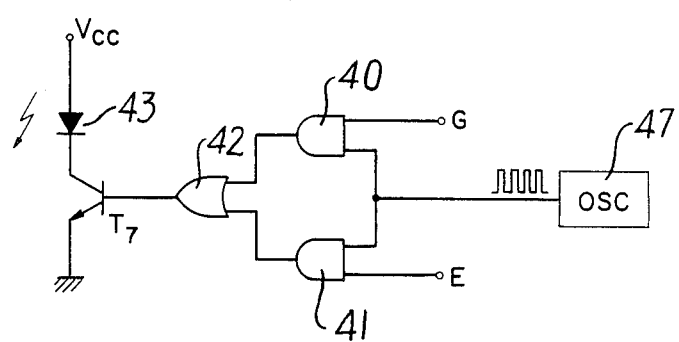
FIG. 6 is a circuit diagram of an indicator for giving an alart signal upon loading a film package without the coded information.

FIG. 6 shows an alarm circuit which gives an alert or warning signal when a film package without the coded of film sensitivity is loaded in a camera operating on the automatic film sensitivity setting device of FIG. 4 or when a valid information of film sensitivity is not obtained from a coded film package. In FIG. 6, indicated at 47 is an oscillator the output of which is applied to input terminals of AND circuits 40 and 41 along with the output G of the AND circuit 32 of FIG. 4 and the output E of the OR circuit 34, and the outputs of the AND circuits 40 and 41 are applied to an OR circuit 42. The output of the OR circuit 42 is supplied to the base of the transistor Tr7 the collector of which is connected to the signalling element 43 as shown. In operation, if a film package without the code of film sensitivity is loaded, the signal G becomes "H" as explained hereinbefore. Accordingly, the signal from the oscillator 47 is applied to the transistor 17 through AND circuit 40 and OR circuit 42 to flicker the signalling element 43. On the other hand, when a film package with a code in the range of ASA 800 to ASA 5000 is loaded, the output E of the OR circuit 34 becomes "H", so that the signalling element 43 is similarly flickered. Although the signalling element is flickered for caution in the above-described embodiment, it is also possible to connect a sound-producing element such as a buzzer or the like to give an alert sound.

What is claimed is:

1. An automatic film sensitivity setting device for cameras in which film sensitivity indicated in coded form on a loaded film package is automatically read in by electric signal terminals and introduced to an exposure control circuit as a parameter for the calculation and control of exposure, said device comprising: means for detecting whether the film package contains coded information of film sensitivity; and means responsive to detection of the absence of coded information of film sensitivity on the film package at all of the signal terminals for automatically always selecting the same predetermined specific film sensitivity.

2. An automatic film sensitivity setting device for cameras as set forth in claim 1, including means for producing a warning signal indicative of the fact that the film package does not contain coded information of film sensitivity.

3. An automatic film sensitivity setting device for cameras as set forth in claim 2, wherein the means for producing a warning signal comprises means for producing a visual warning signal.

4. An automatic film sensitivity setting device for cameras as set forth in claim 2, wherein the means for producing a warning signal comprises means for producing an audible warning signal.

5. An automatic film sensitivity device for a camera of the type equipped to receive either a coded film package containing coded film sensitivity data or an uncoded film package which does not contain coded film sensitivity data, the device comprising: means for detecting whether a film package contains coded film sensitivity data; and circuit means operative in a first mode in response to detection of a film package containing coded film sensitivity data to produce an electric output signal representative of said coded film sensitivity data and operative in a second mode in response to detection of a film package not containing coded film sensitivity data to automatically always produce an electric output signal representative of a predetermined one-and-the-same specific film sensitivity.

6. An automatic film sensitivity device according to claim 5; including means for producing a warning signal in response to detection of a film package not containing coded film sensitivity data.

7. An automatic film sensitivity device according to claim 6; wherein the means for producing a warning signal comprises means for producing a visual warning signal.

8. An automatic film sensitivity device according to claim 6; wherein the means for producing a warning signal comprises means for producing an audible warning signal.

9. An automatic film sensitivity device for a camera of the type equipped to receive a coded film package containing one of a plurality of different coded film sensitivity data, the device comprising: means for detecting whether the one coded film sensitivity data contained on a film package corresponds to one of a predetermined number of different coded film sensitivity data; and circuit means operative in a first mode in response to detection of a correspondence to produce an electric output signal representative of said one coded film sensitivity data and operative in a second mode in response to detection of a non-correspondence to automatically always produce an electric output signal representative of a predetermined one-and-the-same specific film sensitivity.

10. An automatic film sensitivity device according to claim 9; wherein the said predetermined specific film sensitivity corresponds to one of said predetermined number of different coded film sensitivity data.

11. An automatic film sensitivity device according to claim 9; including means for producing a warning signal in response to detection of a non-correspondence.

12. An automatic film sensitivity device according to claim 11; wherein the means for producing a warning signal comprises means for producing a visual warning signal.

13. An automatic film sensitivity device according to claim 11; wherein the means for producing a warning signal comprises means for producing an audible warning signal.

* * * * *